G. W. WATTS.
NUT LOCKING APPLIANCE.
APPLICATION FILED DEC. 15, 1914.

1,142,647.

Patented June 8, 1915.

Witnesses.
Lewis Ernest Sawyer
John Rymond Mooter

Inventor:
George Wilbur Watts

UNITED STATES PATENT OFFICE.

GEORGE WILFER WATTS, OF HOT SPRINGS, ARKANSAS.

NUT-LOCKING APPLIANCE.

1,142,647.  Specification of Letters Patent.  Patented June 8, 1915.

Application filed December 15, 1914. Serial No. 877,368.

*To all whom it may concern:*

Be it known that I, GEORGE W. WATTS, a citizen of the United States, residing at Hot Springs, in the county of Garland and State of Arkansas, have invented a Nut-Locking Appliance, of which the following is a specification.

My invention is an improvement in the class of nut-locks in which a clamp-screw is threaded through the side of a nut and its point engages the thread of the bolt to which the nut is applied.

The details of construction, arrangement, and combination of parts involved in my invention, are hereinafter described, and illustrated in the accompanying drawings, in which—

Figure 1:
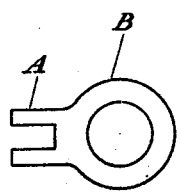
Figure 2:
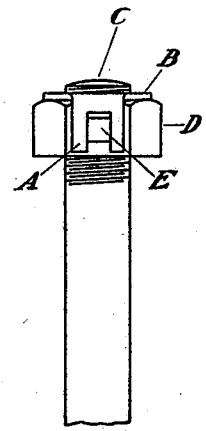
Figure 3:
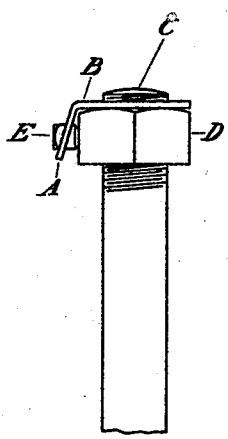
Figure 4:
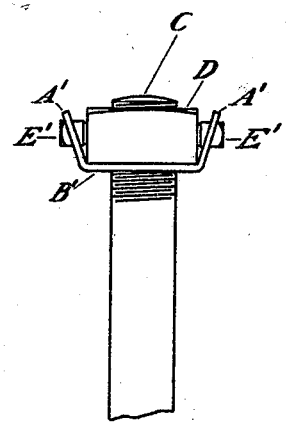

Figure 1 is a plan view of the screw-locking device embodying part of my invention, Figs. 2 and 3 are different side views showing the locking device applied to a nut and bolt, a portion of the nut being shown in section in Fig. 3; and Fig. 4 is a side view showing a modification.

As shown in Fig. 1, the screw-locking device is a plate B having a threaded opening for the reception of a screw-bolt C and a lateral projection A provided with an open slot so that it is practically in the form of a fork, and may be so designated. The sides of the slot are parallel to adapt the same to receive and engage with the polygonal head of a clamp-screw E, as shown in Figs. 2 and 3.

D indicates a polygonal nut screwed upon the screw-bolt C, both of these parts being of the usual construction.

E indicates a clamp-screw having a polygonal head and passing through a threaded bore in the side of the nut.

In applying the nut-locking device, the nut D being screwed on the bolt C, and the clamp-screw E inserted in the nut so as to engage the thread of the bolt C, as shown in sectional view in Fig. 3, then the screw-locking device B is screwed on the portion of the bolt that projects through the nut, and the forked end A of the device is next bent inward to embrace and engage the polygonal head of the screw E, whereby the screw is effectively locked so that it cannot become loosened by vibration of the parts in actual use.

In Fig. 4, I show a modification in that the locking device is double, the part B' being screwed on the bolt below the nut and provided with two forks A' which engage the heads of opposite screws E'.

It is apparent that by the construction and combination of parts described, the nut is first of all locked by the clamp-screw, and the latter is in turn locked by the forked device B, so that loosening of the nut by jarring or vibration is impossible.

What I claim is:

The combination, with a screw-bolt and a nut applied thereto, and a clamp-screw passing through a bore in the side of the nut and engaging the bolt-thread, of a screw-locking device consisting of a plate having a threaded opening which adapts it to be screwed on the bolt, and also a lateral projection provided with a rectangular slot, and bent inward to embrace the head of the clamp-screw, as described.

GEORGE WILFER WATTS.

Witnesses:
  L. E. SAWYER,
  JOHN R. MOOTER.

Copies of this patent may be obtained for five cents each, by addressing the "Commissioner of Patents, Washington, D. C."